(No Model.)

P. GIOVANNINI.
MACARONI MACHINE.

No. 355,926. Patented Jan. 11, 1887.

Witnesses:
Geo. H. Strong
J. H. Nourse

Inventor
Ph. Giovannini
By Dewey & Co.
Attys

N. PETERS, Photo-Lithographer, Washington, D. C.

UNITED STATES PATENT OFFICE.

PHILIP GIOVANNINI, OF SAN FRANCISCO, CALIFORNIA.

MACARONI-MACHINE.

SPECIFICATION forming part of Letters Patent No. 355,926, dated January 11, 1887.

Application filed August 19, 1886. Serial No. 211,344. (No model.)

*To all whom it may concern:*

Be it known that I, PHILIP GIOVANNINI, of the city and county of San Francisco, State of California, have invented an Improvement in Macaroni-Machines; and I hereby declare the following to be a full, clear, and exact description of the same.

My invention relates to an apparatus for the manufacture of macaroni and similar pastes; and it consists in the constructions and combinations of devices which I shall hereinafter describe and claim.

Figure 2:
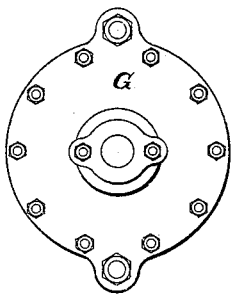
Figure 3:
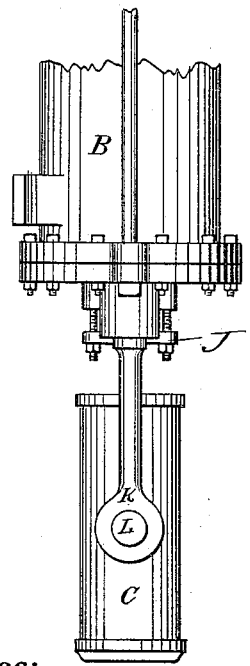
Figure 1:
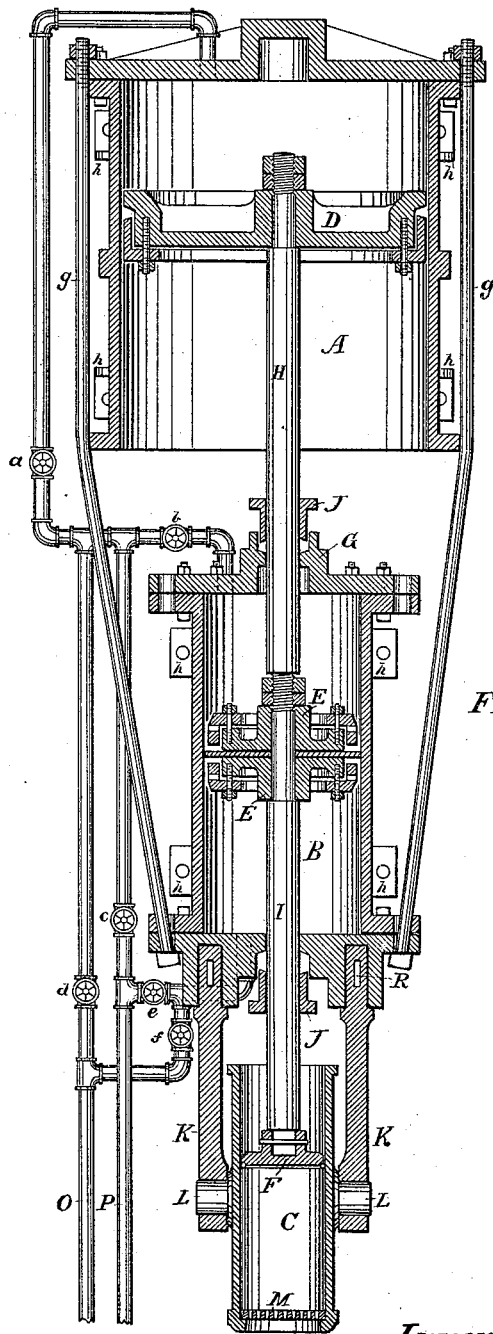

Referring to the accompanying drawings for a more complete explanation of my invention, Figure 1 is a longitudinal vertical section of the apparatus. Fig. 2 is an end view of the first pressure-cylinder head. Fig. 3 is a view of the lower end of the first cylinder and the forming-cylinder, with the trunnions upon which it is hung.

A, B, and C are three cylinders having, respectively, the pistons D, E, and F, which fit within them, and the piston-rods H and I, extending in line with each other and connecting the pistons together. The upper cylinder, A, is of the largest diameter, and the first cylinder, B, is of smaller size, these two cylinders receiving the pressure of the water, and C is the smallest cylinder, having one end open to receive the charges, and the other provided with a perforated plate or head through which the paste is forced, so as to give it the proper form.

The cylinder C is suspended centrally upon trunnions L, which turn in suitable boxes or openings in the lower ends of the suspending-posts K. The space between the upper or open end of this cylinder and the stuffing-box gland J at the lower end of the cylinder B is sufficient to allow the plunger F to be entirely withdrawn from the cylinder C, after which the cylinder may be turned about its trunnions, so as to stand at right angles with its working position with the mouth uppermost and in position to receive the charge of dough or paste to be operated on. After this has been introduced the paste-cylinder is again turned into position in line with the pressure-cylinder and the piston is introduced into its mouth, when it will be ready for operation.

The plunger F is loosely connected with the lower end of the piston-rod I by means of a pin passing through it, as shown, this pin allowing it to move and adjust itself upon the lower end of the rod. The piston-rod I extends up through the piston E, to which it is secured by nuts or any other suitable arrangement. The piston-rod H, passing out from the cylinder A, passes through the stuffing-box G and gland J at the upper end of the cylinder B, and the lower end of this piston-rod rests upon the upper end of the piston-rod I, but is not otherwise connected with it. The cylinders are all held together and kept in position by means of stout iron rods $g$ passing through the flanges of the upper and lower cylinders, and having nuts by which they may be drawn as tightly as required.

$h$ are lugs or plates cast upon the cylinders and having bolt-holes by which they may be secured to a suitable bed or support.

O and P are pipes connecting with the ordinary water-main where the pressure in this main is sufficient for the purpose, or they may receive water from an elevated tank, or in the absence of such a constant pressure they may be supplied by means of a pump or from other suitable source.

$a, b, c, d, e$, and $f$ are valves or cocks, which may be opened to admit water or to allow it to escape from either or both of the pressure-cylinders, as may be required.

The operation of the apparatus is as follows: When the pressure is sufficient for the purpose, only the smaller cylinder, B, will be needed for the work. In this case the water is admitted through the pipe P, the valves $a$ and $e$ and $d$ being closed and the valves $c$ and $b$ opened, thus allowing the water to enter the upper end of the cylinder B above the piston E, which is forced downward, and through its piston-rod I actuates the plunger F in the paste-cylinder C. If the upper cylinder, A, is not used its piston may remain stationary, not necessarily following the movement of the piston E, as its rod is not connected thereto; but if the pressure is insufficient to admit the proper work being done with the cylinder B alone, then the valve $a$ may be opened and water will be allowed to pass into the upper end of the cylinder A, so as to act upon the piston D, and through the rod H its power is added to the power of the piston E in the cylinder B, the two acting to force the plunger F downward in the cylinder C. When the operation has been completed and the cylinder C emptied of paste, the valve c will be closed, the valve b remaining open and the valve d in the pipe O will also be open. The valve e being opened, the passage will be open between the pipe P and the lower end of the cylinder B, through which water is admitted to force the piston back again. If only the cylinder B has been used the valve a will be closed and the water above the piston E will be forced out through the valve b; thence, passing downward through the valve d and the pipe O, it will escape. If both cylinders A and B have been used the valve a will also be open, and the water above the piston D will also escape through the pipe from the top of the cylinder and the valve a and pipe O. The pressure of water in the cylinder B will always be sufficient to raise all the pistons, and the cylinder A may therefore be left open at its lower end, as no pressure will be needed from this side of its piston.

The whole apparatus is compact, effective, and easily operated. The cylinders may be placed in any desired position; but I have been using them at an angle in my practice.

Having thus described my invention, what I claim as new, and desire to secure by Letters Patent, is—

1. In a macaroni-machine, the combination, with the pressure-cylinders A and B, having their axes in line, of pistons fitting said cylinders, connecting-rods H and I, the paste-cylinder C, suspended upon trunnions in line with the pressure-cylinders, and the piston F, working in said cylinders, substantially as herein described.

2. The paste-cylinder suspended upon trunnions, the forming-plates, the piston-rod I, and the plunger loosely secured to the lower end of said rod, in combination with the pressure-cylinders in line with the paste-cylinder and having pistons and rods, as described, and the water-supply and discharge pipe, and controlling-valve, substantially as herein described.

3. The pressure-cylinders united together with their axes in line and having pistons and piston-rods, whereby the pressure of both cylinders may be applied in line, in combination with the piston F, connected with the piston of the pressure-cylinders, and the paste-cylinder suspended upon trunnions in line with the pressure-cylinders, substantially as herein described.

4. The paste-cylinder C and pressure-cylinder B, having their pistons attached to a single rod, by which they are connected, in combination with a supplemental pressure-cylinder, A, standing in line with the other two and having its piston-rod extending through the stuffing-box in the cylinder B, but disconnected from the piston-rod of said cylinder, substantially as herein described.

5. The paste-cylinder and the independent pressure-cylinder standing in line therewith and having their pistons unconnected, in combination with the inlet and discharge pipes P and O and valves or cocks whereby water may be admitted to one or both of the pressure-cylinders to force the pistons downward and admitted into one of said cylinders to return the pistons, substantially as herein described.

In witness whereof I have hereunto set my hand.

PHILIP GIOVANNINI.

Witnesses:
S. H. NOURSE,
H. C. LEE.